United States Patent [19]

Hegner et al.

[11] Patent Number: 5,050,034

[45] Date of Patent: Sep. 17, 1991

[54] PRESSURE SENSOR AND METHOD OF MANUFACTURING SAME

[75] Inventors: Frank Hegner, Lörrach; Manfred Frank, Maulburg; Thomas Klähn, Freiburg/Br., all of Fed. Rep. of Germany

[73] Assignee: Endress u. Hauser GmbH u. Co., Fed. Rep. of Germany

[21] Appl. No.: 570,312

[22] Filed: Aug. 21, 1990

[30] Foreign Application Priority Data

Jan. 22, 1990 [EP] European Pat. Off. ........ 90810045.6

[51] Int. Cl.⁵ .......................... H01G 7/00; G01L 9/12
[52] U.S. Cl. .................................. 361/283; 29/25.42; 73/718
[58] Field of Search ................. 361/283; 73/718, 720; 228/121, 122; 29/25.42, 25.41

[56] References Cited

U.S. PATENT DOCUMENTS

| | | | |
|---|---|---|---|
| 4,064,550 | 12/1977 | Dias et al. | 361/283 |
| 4,129,242 | 12/1978 | Dias et al. | 228/121 |
| 4,198,670 | 4/1980 | Mann | 361/283 |
| 4,901,904 | 2/1990 | Tsuno | 228/121 X |
| 4,935,841 | 6/1990 | Jonasson et al. | 361/283 |
| 5,001,595 | 3/1991 | Dittrich et al. | 73/718 X |

FOREIGN PATENT DOCUMENTS 2706505 10/1977 Fed. Rep. of Germany .

Primary Examiner—Donald A. Griffin
Attorney, Agent, or Firm—Barnes & Thornburg

[57] ABSTRACT

The substrate (12) and/or the diaphragm (11) of the pressure sensor (10) are made of ceramic, glass, or a single-crystal material. The side of the diaphragm (11) facing the substrate (12) is covered with a layer of silicon carbide, niobium, or tantalum which, in turn, is covered with a protective layer (21) and serves as one capacitor electrode (14). The side of the substrate (12) facing the diaphragm (11) is covered with at least one additional layer of any one of said materials which, in turn, is covered with an additional protective layer (22) and serves as the second capacitor electrode (15). Substrate (12) and diaphragm (11) are soldered together by a formed part of active solder (20) which also serves as a spacer.

This pressure sensor can be manufactured in a single soldering step. The maximum load capacity of the diaphragm is determined not by the strength of the joint, but only by the strength of the diaphragm material. The pressure sensor can be used at higher temperatures than pressure sensors with glass-frit joints.

7 Claims, 2 Drawing Sheets

PRESSURE SENSOR AND METHOD OF MANUFACTURING SAME

The present invention relates to a pressure sensor as set forth in claim 1 and to a method of manufacturing same as set forth in claim 7. According to the wording of claim 1, the pressure sensor has a substrate and a diaphragm which are joined together, particularly in a defined spaced relationship and parallel to each other, forming a chamber sealed at least at the edge, wherein the substrate and/or the diaphragm are made of ceramic, glass, or a single-crystal material, the side of the diaphragm facing the substrate is covered with a layer of silicon carbide, niobium, or tantalum which, in turn, is covered with a protective layer and serves as one capacitor electrode, the side of the substrate facing the diaphragm is covered within the chamber with at least one additional layer of any one of said materials which, in turn, is covered with an additional protective layer and serves as the second etc. capacitor electrode, and the substrate and the diaphragm are soldered together by a formed part of active solder which also serves as a spacer.

Investigations conducted by the inventors have shown that conventional layer materials for capacitor electrodes of pressure sensors, such as copper, gold, silver, or platinum, exhibit a number of disadvantageous effects which occur during the active soldering of substrate and diaphragm, which are coated with the electrodes. On the one hand, the solder, because of its good wetting ability, spreads over the electrode surface outside the joint, so that the substrate and the diaphragm may be soldered together in the electrode area. On the other hand, the electrode material of the diaphragm, which material may be only 100 nm to 500 nm thick, for example, alloys so well with the solder that interruptions of the electrical contact between solder and electrode material may result.

Furthermore, conventional pure alumina ceramic and commercially available active solders, containing 1 to 5% titanium, differ widely in their thermal coefficients of expansion, so that the zero-point and sensitivity temperature coefficients of the pressure sensor may be adversely affected.

There is one application of pressure sensors, namely if they are used as reference-pressure sensors, in which the chamber communicates with the reference-pressure medium, e.g., the surrounding air. The moisture in the surrounding air gets into the chamber and, thus, to the capacitor electrodes, where it may deposit under certain circumstances. When a voltage from the circuit for measuring the pressure-dependent capacitance change is applied, the electrodes may thus corrode. Furthermore, contacting of the electrodes by means of active-solder insets in the substrate requires step soldering, i.e., at least two soldering steps.

Finally, the mechanical properties of the diaphragm must not be impaired by too thick electrode layers, which is why the above-mentioned thickness between 100 nm and 500 nm is required.

Accordingly, the object of the invention as claimed is to avoid the problems described by an appropriate choice of materials, i.e., to find for the capacitor electrodes, their terminal pads, and the joints, in particular, suitable materials which do not have the disadvantages described and do not place any undue constraints on the selection of the process parameters. In addition, the pressure sensor is to be usable at higher temperatures than pressure sensors with glass-frit joints, and the maximum load capacity of the diaphragm is to be determined not by the strength of the joint, but only by the strength of the diaphragm material. Finally, the manufacturing costs are to be as low as possible.

It has been found that, if either of the high-melting-point metals niobium and tantalum or silicon carbide is used as electrode material, the "alloying away" of the electrode material by the active solder can be practically completely avoided over a wide soldering-temperature range. A tantalum layer with a thickness of only 100 nm, for example, easily withstands a 1000° C. soldering process with an active solder.

Spreading of the active solder over the electrodes and corrosion of the latter are prevented by the protective layers, which are oxides of the respective materials mentioned above. Thus, in the case of tantalum, this is preferably tantalum pentoxide. These oxide layers may be formed in a conventional manner by thermal or anodic oxidation. In the combination of all properties, tantalum is the optimum electrode material. Although tantalum has a relatively high resistivity, pressure sensors with 100 nm thick electrodes and a capacitance of 50 pF have a Q of $3 \times 10^4$ to $4 \times 10^4$ at a test frequency of 100 kHz.

With the above-mentioned materials for the electrodes, only a single soldering operation is necessary whereby both the substrate and diaphragm are joined together and the electrodes are contacted through a high-vacuum-tight seal. The latter is preferably done from the side of the substrate facing away from the diaphragm by means of active-solder insets extending to the second etc. capacitor electrode and the active solder, respectively, with each capacitor electrode of the substrate having at the contact point a capillary stopper in the form of a flare of the hole containing the active-solder inset.

The use of only this single soldering operation is also made possible by the just mentioned capillary stopper, in which the holes in the substrate may end on the chamber side. Thus, the active solder, when becoming liquid, cannot skip the small gap between the opposite capacitor electrodes due to capillary action, which prevents it from advancing to the plane of the electrode of the substrate.

This single soldering operation is also apparent from the wording of method claim 7. According to this claim, the manufacture of pressure sensors with a diaphragm and a substrate having suitable holes, which are flared where necessary, comprises the steps of depositing the capacitor electrodes on the diaphragm and the substrate, forming the protective layers on the capacitor electrodes, introducing the active-solder insets into the holes in the substrate, heating the coated and loaded substrate, the coated diaphragm, and the interposed formed part of active solder, preferably in a vacuum, until the active solder has melted through, and allowing this assembly to cool down.

Further features and advantages of the invention will become apparent from the following description of embodiments illustrated in the figures of the accompanying drawings, where like parts are designated by like reference characters. In the drawings, FIG. 1 is a top view of a first embodiment of a pressure sensor in accordance with the invention;

Figure 1:
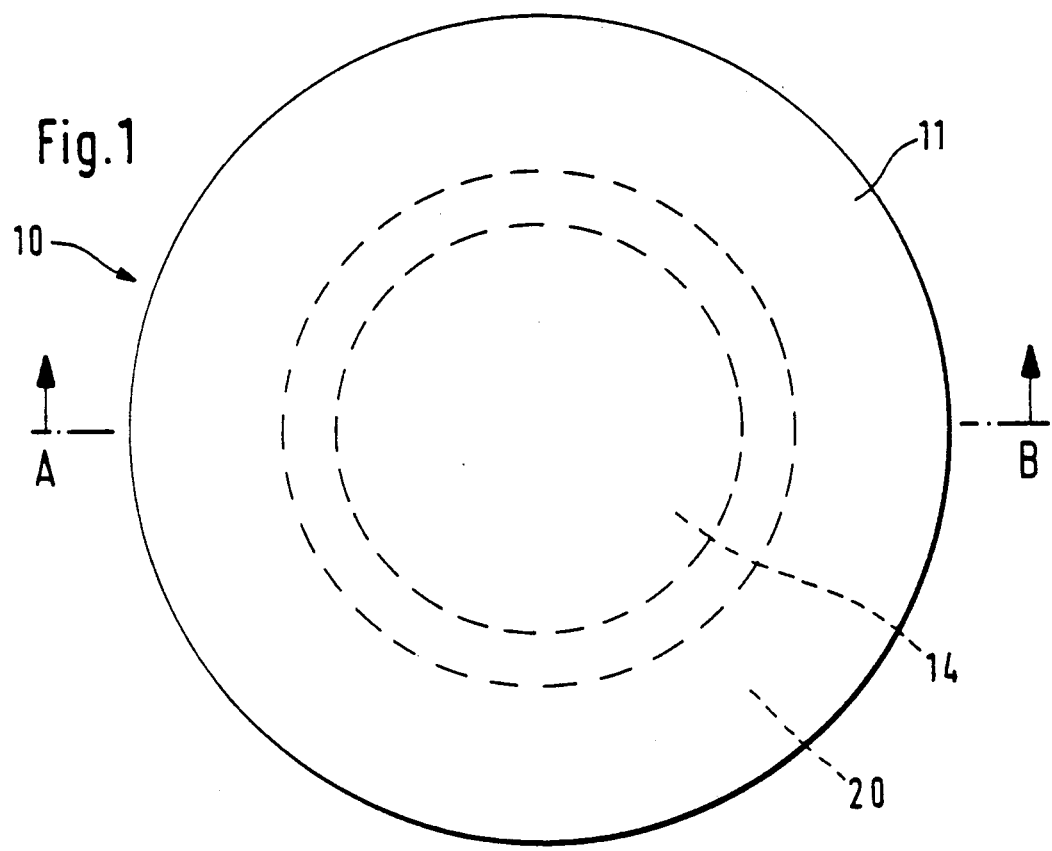
Figure 2:
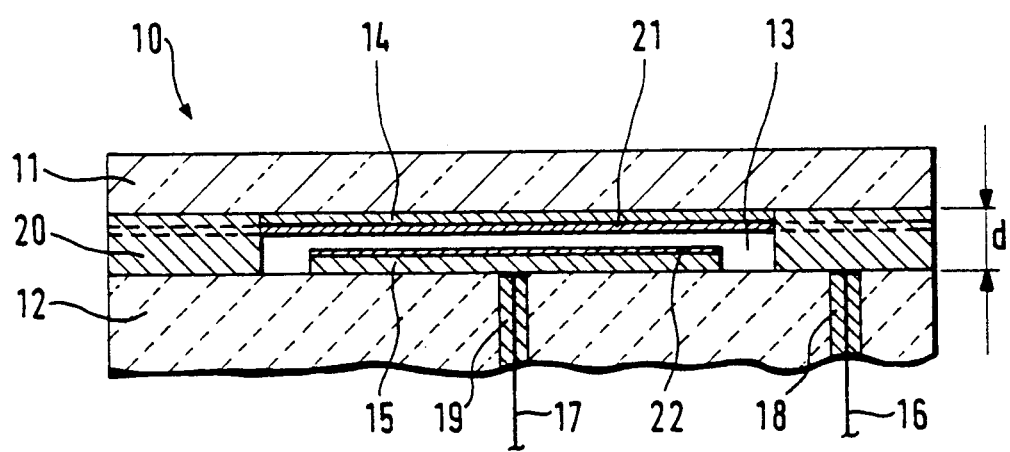
FIG. 2 is a section taken along line A—B of FIG. 1.

The pressure sensor 10 shown in FIGS. 1 and 2 has a diaphragm 11 in the form of a circular disk with plane-parallel surfaces which is joined around the periphery to a circular substrate 12 in a defined spaced relationship d, so that a chamber 13 is formed between the flat top side of the substrate 12 and the opposite surface of the diaphragm 11. The diaphragm 11 may be of ceramic, glass, or a single-crystal material. The substrate 12 may be of ceramic, glass, or a single-crystal material, too, but the materials of the diaphragm 11 and substrate 12 may differ. The diaphragm 11 is elastic, so that it can deform when pressure is applied to it. The substrate 12 may be solid and rigid, but if desired, it may also be a flat elastic disk like the diaphragm 11.

Those surfaces of the diaphragm 11 and the substrate 12 which face each other are provided with circular capacitor electrodes 14 and 15, respectively, of metal which are located opposite each other within the chamber 13 and spaced a given distance apart. The electrode 14 completely covers the diaphragm 11; however, it may also be provided only in the area of the chamber. Each of the electrodes 14, 15 is covered with a protective layer 21, 22. This protective layer is formed, for example, from one of the oxides of the material from which the electrodes are formed, as was mentioned above.

Connected to the electrode 14 and the conductive layer 15 are terminal leads 16 and 17, respectively, which are brought out through the substrate 12 in a gas-tight manner. The two electrodes constitute a capacitor whose capacitance depends on the distance between the conductive layers. When the diaphragm 11 deforms under pressure, the distance between the two electrodes changes, thereby changing the capacitance of the sensor. This capacitance can be measured by means of an electronic circuit connected to the terminal leads 16 and 17, and thus is a measure of the pressure on the diaphragm 11.

This may be, for example, a pressure applied to the pressure sensor from outside if the chamber 13 has been evacuated. On the other hand, the chamber 13 may also communicate with the outside, e.g., through a hole in the substrate 12, so that the pressure sensor can be used as a reference-pressure sensor.

Figure 3:
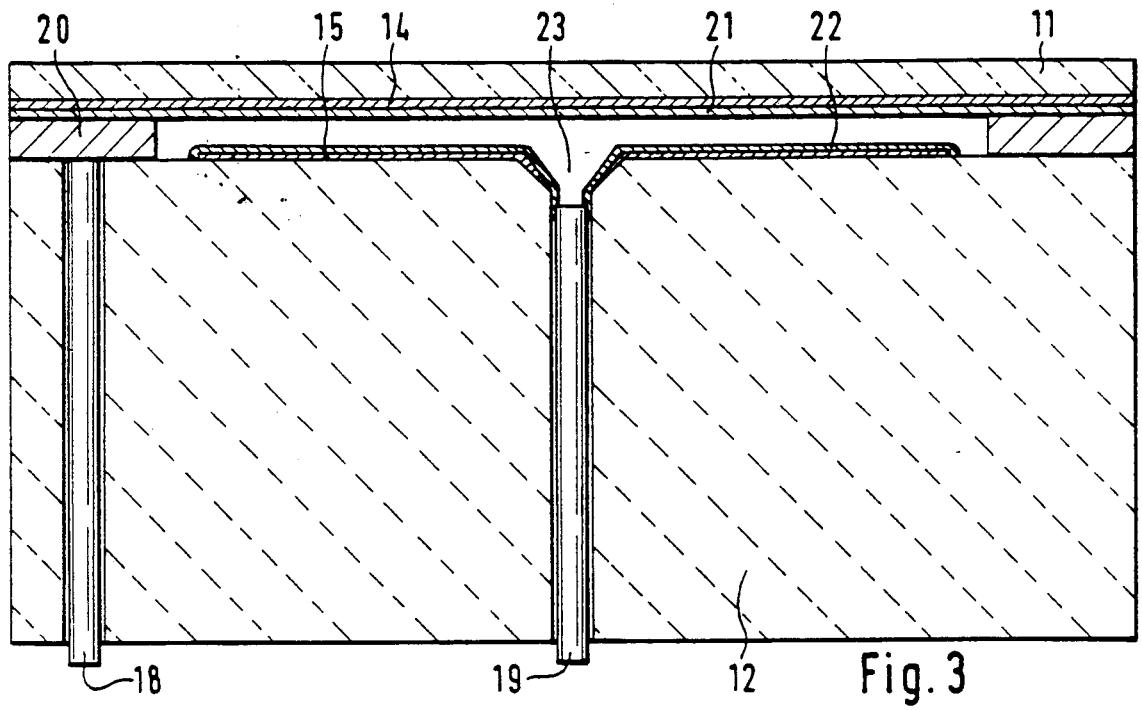
FIG. 3 is a section of a second embodiment of the pressure sensor in accordance with the invention.

In a second embodiment of the pressure sensor, shown in FIG. 3 in a schematic cross-sectional view, to prevent the active solder of the active-solder inset 19 from skipping to the capacitor electrode 14 of the diaphragm 11, the end of the hole on the chamber side has a flare 23, which receives the active-solder inset 19. Thus, when the active solder becomes liquid, capillary attraction, which would otherwise cause the active solder to grow beyond the electrode plane of the substrate 12, is prevented. The flare 23 thus acts and serves as a capillary stopper.

Figure 4:
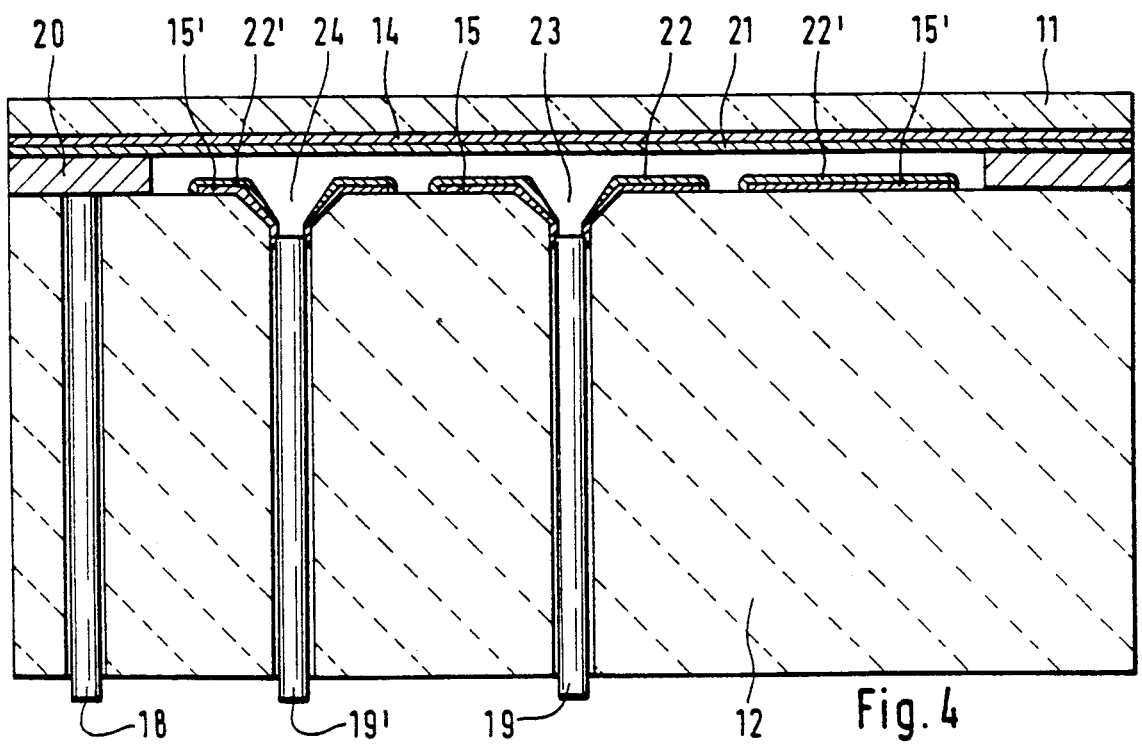
FIG. 4 is a section of a third embodiment of the pressure sensor in accordance with the invention.

In a third embodiment of the pressure sensor, shown in FIG. 4 in a schematic cross-sectional view, the substrate 12 has two spaced-apart, concentric capacitor electrodes 15, 15'; the electrode 15' thus encircles the electrode 15, which forms a circular area at the center. In the same way as the electrode 15 is covered by the protective layer 21, the additional electrode 15' is covered by an additional protective layer 21'. Contact is made to the additional electrode 15' by the additional active-solder inset 19'. This structure, using two capacitors having a common electrode, namely the electrode 14 of the diaphragm 11, may also be used in the embodiment of FIGS. 1 and 2, of course.

In FIG. 4, the hole for the additional active-solder inset 19' has, at its end on the chamber side, a flare 24, too, which has the same effects and advantages as the flare 23. In FIGS. 3 and 4, the terminal leads at the active-solder insets 18, 19, 19' have been omitted for the sake of simplicity.

In the finished pressure sensor, contact is made to the diaphragm electrode 14 via the active solder 20 of the joint and via the terminal lead 16. The latter and the terminal lead 17 are contacted by the active-solder insets 18 and 19, respectively. The active-solder inset 19 extends to the substrate electrode 15, and the active-solder inset 18 extends to the active solder 20 at the joint and is thus connected to the diaphragm electrode 14. The latter is indicated at the joint by a dashed line.

In a preferred embodiment of the invention, the capacitor electrodes 14, 15, 15' are made of tantalum, and their protective layers 21, 22, 22' of tantalum pentoxide.

A peculiarity of the pressure sensor shown consists in the way the diaphragm 11 and the substrate 12 are joined together. This is done by means of a ring-shaped part of active solder 20, which establishes the connection between the diaphragm 11 and the substrate 12 and also serves as a spacer by holding the diaphragm 11 at a defined distance d from the substrate 12. To establish the connection, use is made of a thermal process which permits the diaphragm 11 and the substrate 12 to be joined directly to the active solder 20 without previous metallization of the nonmetallized portion of the substrate 12 and without the use of a flux. Thus, an extremely strong and gastight joint between the diaphragm 11 and the substrate 12 is obtained by means of the ring-shaped part of active solder 20, so that the chamber 13 is hermetically sealed from the surrounding atmosphere.

Active solder is a solder which contains at least one strongly reactive element, such as titanium, zirconium, beryllium, hafnium, or tantalum. During the soldering process, these reactive elements wet the surfaces of the parts to be soldered. If these parts are made of oxide ceramic, the high affinity of the reactive elements for oxygen will cause a reaction with the ceramic, which leads to the formation of mixed oxides and free chemicals valences. The reactive component of the solder is embedded in a matrix of other alloying elements, such as silver/copper. These form the soldering material proper.

Ductile active-solder alloys contain 1 to 5% titanium, which is homogeneously embedded in a matrix of, e.g., silver/copper. These alloys can be formed like normal brazing solders into parts of any shape and, thus, into the ring-shaped part shown in FIG. 2, which serves as a spacer.

Typical commercially available active solders are the alloys silver/titanium, silver/copper/titanium, and silver/copper/indium/titanium, whose soldering temperatures range between 750° C. and 1050° C. Thus, step soldering (gradations in the melting points) is also possible with active solders. The strengths of active solders are identical with the strengths of comparable titanium-free brazing solders. The bond strength to ceramic is greater than the strength of the ceramic itself; in a tensile test, the fracture will therefore lie in the ceramic, not in the ceramic-to-solder interface.

The soldering of the ceramic parts by means of the active solder is preferably carried out in a vacuum at at least $10^{-5}$ mbars, better in the $10^{-6}$-mbar range. Very good vacuum is necessary in order to avoid reactions of the titanium with the residual gas and achieve good wetting of the ceramic.

To obtain specific soldering results, e.g., to reduce the evaporation of the solder or to reduce surface oxides, it may be advantageous to carry out the heating or soldering process in a defined gas atmosphere of inert gas and/or reactive gas. The partial pressures of these gases are preferably below 10 mbars.

During active soldering, as during conventional soldering, the solder is completely melted through. The soldering temperature of the active solder, however, should be 30° C. to 100° C. above the liquidus temperature to obtain an optimum reaction of the titanium with the ceramic. In this manner, high strength and vacuum tightness are achieved.

Besides these ductile active solders, brittle active solders can be used in the invention. To the inventor's surprise, he found that during thermal-shock cycles, the properties of the pressure sensor were not changed despite differences in the coefficients of expansion of the diaphragm/substrate material and the brittle active solder. Brittle active solders are composed of 30% to 60% copper and a remaining percentage of zirconium, or 24% nickel and 76% zirconium, or 36% to 75% copper and 64% to 25% titanium, for example. These active solders must be applied in the form of sintered rings or solder paste between substrate and diaphragm.

Preferably, the active-solder rings may be formed by the so-called melt-spinning technique, whereby the solder is first produced in amorphous form as a ductile foil. Thus, it is readily machinable and can be given any shape. After the soldering process, the solder is given its crystalline properties.

As measurements show, the properties of pressure sensors using such brittle active solders as joining materials are not changed by thousands of thermal-chock cycles between $-20°$ C. and $+140°$ C. In particular, no hairline cracks are formed which—if vacuum tightness is intended—would make the chamber leaky.

Examination of the joint shows no changes in structure. Since brittle active solders can be used, too, there is a wider range of materials for the diaphragm/substrate and active solder to choose from than before.

What is claimed is:

1. Pressure sensor comprising a substrate and a diaphragm which are joined together, particularly in a defined spaced relationship and parallel to each other, forming a chamber sealed at least at the edge, wherein
    the substrate and/or the diaphragm are made of ceramic, glass, or a single-crystal material,
    the side of the diaphragm facing the substrate is covered with a layer of silicon carbide, niobium, or tantalum which, in turn, is covered with a protective layer and serves as one capacitor electrode,
    the side of the substrate facing the diaphragm is covered within the chamber with at least one additional layer of any one of said materials which, in turn, is covered with an additional protective layer and serves as the second capacitor electrode, and
    the substrate and the diaphragm are soldered together by a formed part of active solder which also serves as a spacer.

2. A pressure sensor as claimed in claim 1, wherein the diaphragm is completely covered with said one capacitor electrode.

3. A pressure sensor as claimed in claim 1 wherein the capacitor electrodes are formed from tantalum, and wherein the protective layers are formed from said capacitor electrodes by thermal or anodic oxidation.

4. A pressure sensor as claimed in claim 1 wherein electrical contact is made to the capacitor electrodes from the side of the substrate facing away from the diaphragm by means of active-solder insets extending to the second, capacitor electrode and the active solder, respectively, with each capacitor electrode of the substrate having at the contact point a capillary stopper in the form of a flare of the hole containing the active-solder inset.

5. Method of manufacturing a pressure sensor as claimed in claim 4, with the substrate having suitable holes, which are flared where necessary, comprising the steps of
    depositing the capacitor electrodes on the diaphragm and the substrate,
    forming the protective layers on the capacitor electrodes,
    introducing the active-solder insets into the holes in the substrate,
    heating the coated and loaded substrate, the coated diaphragm, and the interposed formed part of active solder, preferably in a vacuum, until the active solder has melted through, and
    allowing this assembly to cool down.

6. A pressure sensor as claimed in claim 1 with a ductile active solder based on a silver-copper alloy preferably containing titanium as a reactive element.

7. A pressure sensor as claimed in claim 1 with a brittle active solder based on copper/zirconium, nickel/zirconium, or copper/titanium.

* * * * *